A. E. SMITH.
Thill-Coupling.
No. 35,785. Patented July 1, 1862.
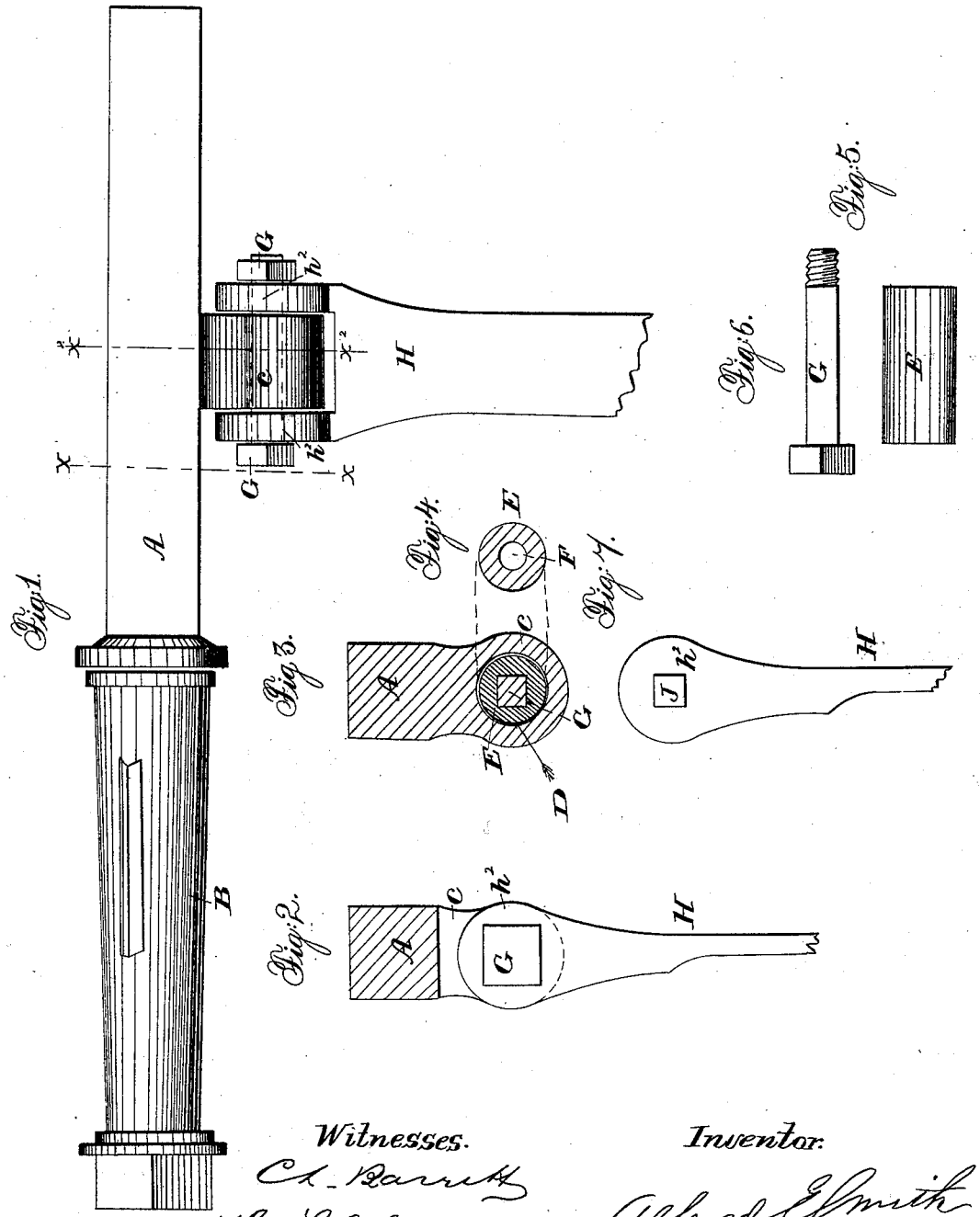
Witnesses.  Inventor.

UNITED STATES PATENT OFFICE.

ALFRED E. SMITH, OF BRONXVILLE, NEW YORK.

IMPROVEMENT IN ATTACHING THILLS TO AXLES.

Specification forming part of Letters Patent No. 35,785, dated July 1, 1862.

*To all whom it may concern:*

Be it known that I, ALFRED E. SMITH, of Bronxville, Westchester county, State of New York, have invented certain new and useful improvements in attaching thills to the axles of wagons and other vehicles by the formation of a solid jack or eye on the axle at the time of forging it, and the method of securing the thills thereto; and I do hereby declare the following to be a full description of the same.

The nature of my invention consists, first, in forging the jack or eye to which the thills are attached upon the front edge of the axle, in contradistinction to the usual method of making the jack or eye from an independent piece of metal and securing it upon the axle by a clip; secondly, in forming the hole through the jack considerably larger in diameter than the bolt, so as to hold a hollow cylindrical packing of rubber or other suitable substance, and combining therewith a square bolt to attach the thill to the jack, which, being held firmly from rotating in the ear-pieces of the thill-iron, transfers the friction and wear upon them to the packing, and thus not only prevents the wearing of bolt and holes through which it passes, but at the same time prevents the bolts from losing their nuts, as would be the case were the bolts round and the thill-iron worked directly upon them.

To describe my invention more particularly, I will refer to the accompanying drawings, forming a part of this specification, the same letters of reference, wherever they occur, referring to like parts.

Figure 1 is a plan view of a section of the axle, showing the jack and thill-iron attached thereto. Fig. 2 is an edge view of the thill-iron as attached to the jack, as seen through the line $x\,x$, Fig. 1. Fig. 3 is a transverse cut section of the axle and jack, through the line $x^2\,x^2$, Fig. 1, showing the packing and square bolt in combination therewith. Fig. 4 is an end view of the cylindrical packing. Fig. 5 is a side view of the same. Fig. 6 is a side view of the square bolt. Fig. 7 is a side or end view of the thill-iron, showing the square bolt-hole through it.

Letter A is the axle, having on the end of it the ordinary hub-box, B.

Letter C is the jack or eye for attaching the thills thereto. This jack is formed during the operation of forging the axle. The object of this is to strengthen the jack, cheapen the cost of making them, and to make a more elegant finish to the axle than is practicable when jacks are made independent of the axle and clamped upon it by means of clips and bolts. Longitudinally through the center of the jack is formed a cylindrical opening, D, into which is inserted a cylindrical packing, E, which may be of rubber or other suitable material, as desired. Through the packing is formed a small cylindrical opening, F, (though may be made square when wood packing is used,) into which a square bolt, G, is inserted when the thill-irons H are adjusted upon the jacks. These thill-irons are made with ear-pieces $h^2$, through which square bolt-holes J are formed. The object of this is to hold the bolt from turning and cause the friction and wear and tear of the constant motion of the thills when in use to be diverted to the external surface of the packing, and thus not only make a noiseless attachment, but at the same time a more secure as well as a neater and cheaper attachment than has been known of heretofore.

It will be obvious that if the jack were divided and the end of the thill-iron made solid, with a large cylindrical hole through it for the insertion of the packing, and the square bolt used and held from rotating as described, the same beneficial results would follow, and therefore is contemplated as a part of my invention.

Having now described my invention, I proceed to set forth what I claim and desire to secure by Letters Patent—

1. The method of constructing iron or steel axle-trees of wagons and other vehicles with a drawn-out or solidly-welded jack or eye on the front edge thereof for attaching the thills thereto, substantially as hereinbefore set forth.

2. The use of a square bolt and openings in the ear-pieces of the thill-irons to hold the bolt from turning on its own axis, in combination with the packing and jack, for the purposes described, and made and operating substantially as hereinbefore set forth.

ALFRED E. SMITH.

Witnesses:
CHARLES L. BARRETT,
H. T. CLEVELAND.